March 15, 1966  A. W. BRUECKNER  3,240,063
FLOWMETER
Filed Oct. 27, 1960  2 Sheets-Sheet 1
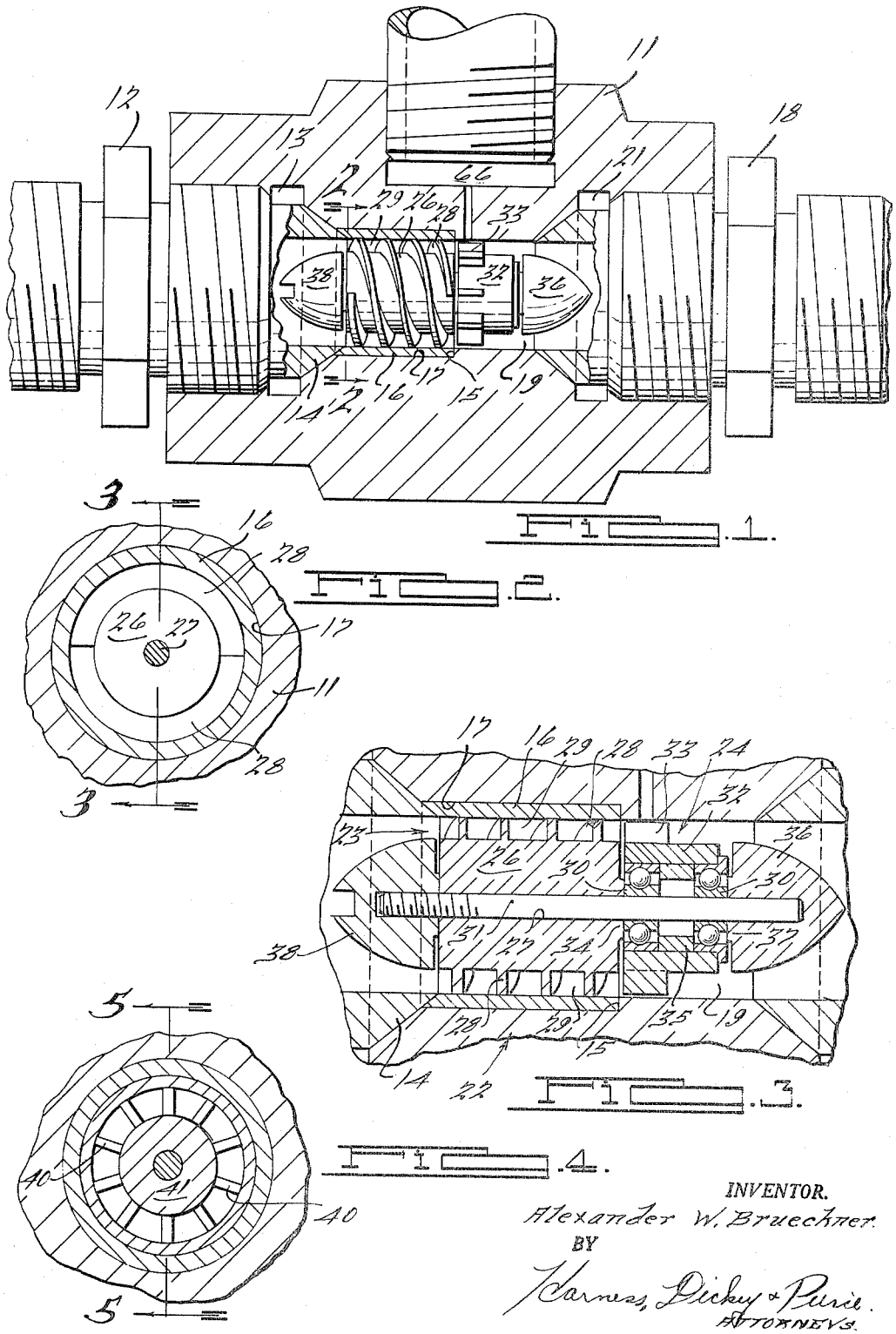
INVENTOR.
Alexander W. Brueckner
BY
Harness, Dickey & Pierce
ATTORNEYS March 15, 1966     A. W. BRUECKNER     3,240,063
FLOWMETER
Filed Oct. 27, 1960                           2 Sheets-Sheet 2
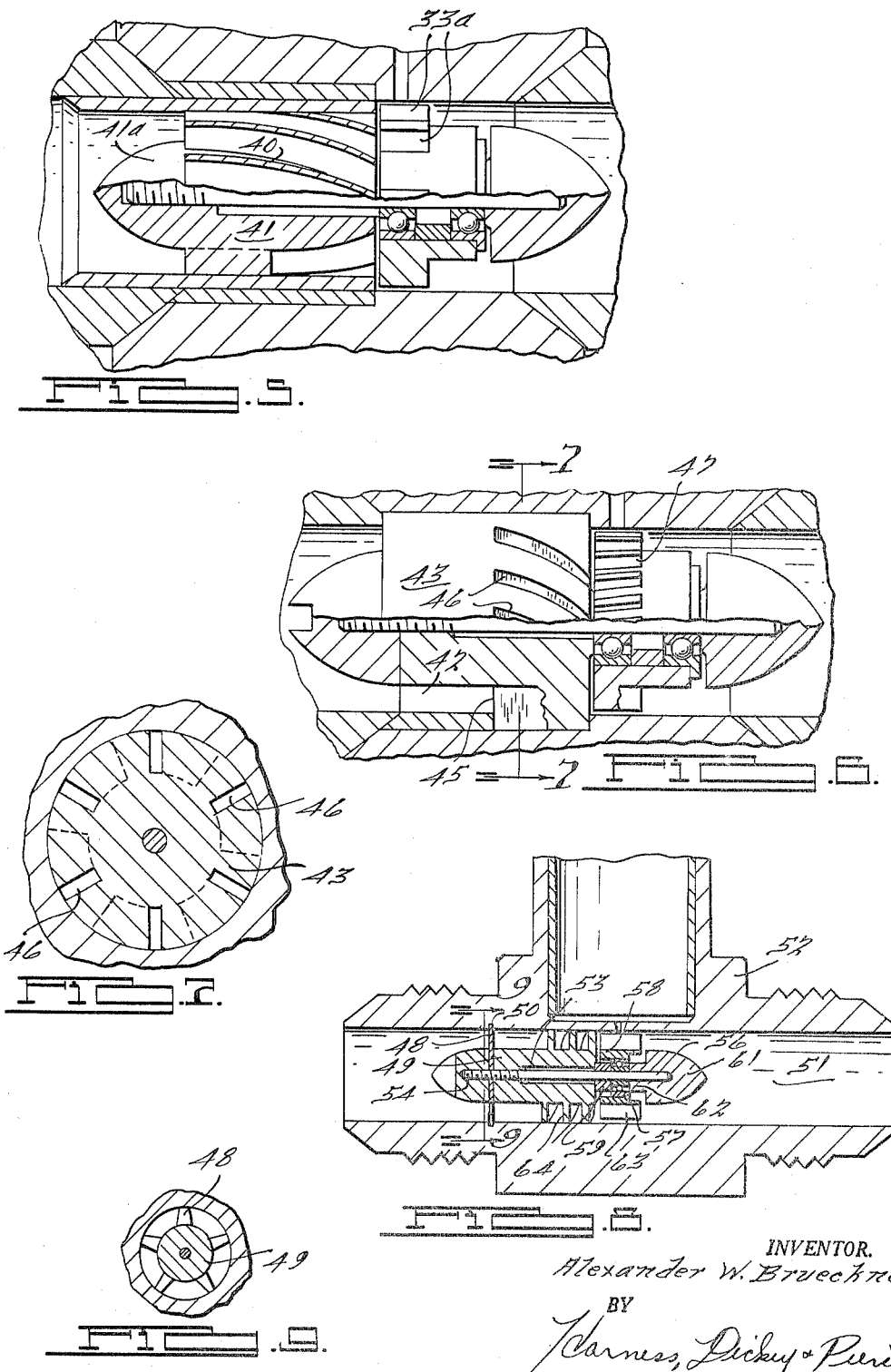
INVENTOR.
Alexander W. Brueckner
BY
Harness, Dickey & Pierce
ATTORNEYS United States Patent Office 3,240,063
Patented Mar. 15, 1966

3,240,063
FLOWMETER
Alexander W. Brueckner, Farmington, Mich., assignor, by mesne assignments, to Lynch Corporation, Anderson, Ind., a corporation of Indiana
Filed Oct. 27, 1960, Ser. No. 65,364
1 Claim. (Cl. 73—231)

This invention relates to flowmeters and more particularly to turbine type flowmeters adapted to measure low fluid-flow rates with improved accuracy.

Flowmeters of the turbine type often use straight flow directors or guide vanes on the upstream side of a turbine rotor to eliminate any rotational component of the movement of the fluid prior to its engagement with the turbine rotor so as to avoid errors arising from variations of the rotational velocity of the fluid. At high flow-rates, the turbine rotor is driven at a rate which accurately represents the velocity. At low-flow rates, however, a given flowmeter turbine rotor may not respond accurately because the momentum of the fluid is too low to rotate the turbine rotor at a velocity accurately related to the rate of fluid flow. While the linear velocity of the fluid at the point of impingement with the rotor blades may be increased by reducing the flow area in that region, reduction in the flow area which is required in order to produce a satisfactory rotational velocity of the rotor at very low rates of flow of the measured fluid tends to result in excessive pressure drops, particularly at higher rates of flow.

Therefore, an object of this invention is to increase the rate of fluid flow adjacent the flowmeter rotor without producing a corresponding increase in pressure drop.

Another object of the invention is to provide an improved means for supporting flow directors within the bore of a turbine type flowmeter.

Further objects, features and advantages of this invention will become apparent from a consideration of the following description, the appended claim and the accompanying drawing in which:

FIGURE 1 is a longitudinal view in partial section of a flowmeter embodying certain of the principles of the present invention;

FIGURE 2 is a cross-sectional view on the line 2—2 of FIGURE 1;

FIGURE 3 is a cross-sectional view on the line 3—3 of FIGURE 2;

FIGURE 4 is a fragmentary transverse cross-sectional view of a modified flowmeter embodying certain of the principles of the present invention;

FIGURE 5 is a fragmentary longitudinal cross-sectional view on the line 5—5 of FIGURE 4;

FIGURE 6 is a fragmentary longitudinal cross-sectional view of another modification embodying certain of the principles of the present invention;

FIGURE 7 is a cross-sectional view taken on the line 7—7 of FIGURE 6;

FIGURE 8 a longitudinal cross-sectional view of still another embodiment of the invention; and FIGURE 9 is a fragmentary cross-sectional view taken along the line 9—9 of FIGURE 8.

Referring now to the drawings, wherein like reference characters designate like or corresponding parts throughout the several views, there is shown in FIGURES 1–3 a tubular valve body 11 having a threaded tubular fitting 12 inserted in the inlet chamber 13 thereof. A sleeve 16 is seated in an enlarged diameter bore portion 17 in the housing 11 and may be press-fitted therein or preferably may be trapped between a shoulder 15 at the end of the bore portion 17 and the tapered end portion 14 on fitting 12.

A second tubular fitting 18 is mounted in the outlet chamber 21 of housing 11, and both these fittings 12 and 18 are threaded so as to be easily coupled in a straight section of line. A bore 19 extends from bore 17 to outlet 21 to provide a fluid passageway from the inlet end of the housing 11 to the outlet end thereof.

A metering unit 22, disposed in sleeve 16 and bore 19 in the housing 11, has a director or guide vane section 23 and a turbine rotor section 24. The guide vane section comprises a hub 26 having a hole 27 along its longitudinal axis. Guide vanes 28 are mounted on the outer periphery of the hub 26 being formed as a spiral, and specifically a helix along the longitudinal direction thereof, and extend radially therefrom to engage sleeve 16. Spiral is intended to mean at an angle to the longitudinal axis and is generic to a situation in which the development of guide vanes such as guide vanes 28 is rectilinear (a helix) as well as when the development is curvilinear (e.g., an exponential curve).

Thus the vanes 28 along with sleeve 16 and the peripheral surface of hub 26 form passageways 29 which spiral from one end of the guide vane section to the other. Such an arrangement has the effect of increasing the force exerted by the fluid flow on the rotor by changing the longitudinal direction of flow at the upstream end of the guide vane section to a flow at an angle to the longitudinal axis at the rotor end or downstream end of the guide vane section. In this embodiment of the invention there is a relatively abrupt increase in velocity at the inlet to director section 23 and an approximately uniform velocity through the guide vanes 28 due to the helical configuration. This particular construction while increasing the fluid force acting on the rotor can be seen to retain a substantial flow area leading up to the turbine rotor portion of the flowmeter. Thus, excessive pressure drop is prevented. Any number of vanes 28 can be provided and the two blades illustrated in the apparatus of FIGURES 1–3 are but representative. The pitch of the vanes may be varied; in FIGURE 1 the pitch or angle the guide vane has to the longitudinal axis is approximately seventy-five degrees. It has been found satisfactory to have the outlet pitch from a director section such as section 23 of FIGURE 1 arranged approximately ninety degrees relative to the pitch of rotor blades such as blades 33 of FIGURE 1. While the vanes in the FIGURE 1 apparatus are illustrated as extending two full turns, it has been found that the redirection of the flow can be satisfactory with a quarter-turn to a half-turn of vanes 28.

The metering unit further comprises a shaft 31 which extends through the hole 27 formed in hub 26. Bearings 30 are mounted on shaft 31 and carry a rotor 32 thereon. Straight blades 33 are mounted on the outer periphery of rotor 32 and extend into the passageway 19 immediately downstream of the outlet from the guide vane section 23. The rotor blades 33 illustrated in FIGURES 1–3 are parallel to the longitudinal axis. This arrangement is merely representative and they could be pitched fifteen degrees so that blades 28 of FIGURE 1 would be at an angle of ninety degrees with respect to the rotor blades 33 to maximize the momentum of the flowing fluid. Hub 26 carries a shoulder 34 which abuts against the upstream bearing 30 at its inner raceway to prevent the outer race of said bearing from contacting hub 26. The upstream bearing 30 is separated from the downstream bearing 30 by an annular spreader disk 35 in order to fully support the rotor 32. A generally conoidal hub 36 having a shoulder 37 formed thereon is secured to the downstream end of shaft 31 with shoulder 37 abutting against the inner race of a downstream bearing 30 to prevent hub 36 from abutting against the outer race of the downstream bearing 30. The other end of shaft 31 is threaded to receive a nut 38 illustrated to be generally conoidal. The nut 38 and hub 36 are so streamlined to provide a smooth transition between the differing cross-sectional flow areas.

The rotation of the rotor 32 is measured in arcuate increments of travel by electrical impulses from a conventional pickup unit 66 which extends through the wall of housing 11 and is disposed in proximity to the revolving rotor blades 33. Pickup unit 66 is disposed in a magnetic circuit with the blades and produces an output signal each time that a blade passes in proximity thereto.

In the modified form illustrated in FIGURES 4 and 5 the guide vanes 40 are not helical, but rather, are curvilinear when developed and are effectively exponential. Thus, they initially run parallel to the longitudinal direction and then are gradually turned over the outer periphery of a tubular cylinder 41, so as to be pitched at an angle approximately sixty degrees to the longitudinal axis. These exponentially curved guide vanes have a uniform rate of change of direction over their length and introduce a rotational flow component in the fluid flow which creates a greater force on the turbine rotor. The vanes 40 illustrated in FIGURE 5 create a uniform acceleration in the fluid flow throughout their length because they are exponentially curved. The acceleration occurs since an increment of rotational flow velocity is being added throughout the length of the guide vanes 40 due to their exponentially curved configuration.

Ten vanes are shown in the embodiment of FIGURES 4 and 5, which number is only representative. Furthermore, pitch can be varied and the length of the vanes is not critical. Since fluid flows from curved blades 40 at an angle of pitch approximately sixty degrees to the longitudinal axis, rotor blades 33a may be turned at a slight angle to the longitudinal axis so that the flow relative to said blades approximates ninety degrees in order to maximize the momentum of the flowing fluid.

A further modification of the guide vane section illustrated in FIGURES 6 and 7 embodies the improved guide vane concept present in the preferred embodiment but represents a different approach to the problem of increasing fluid force on the rotor blades at low flow rate while avoiding excessive pressure drop. This embodiment comprises an annular collecting chamber 42 in the upstream direction formed by the walls of an annular tubular member 43. Curved grooves 46 extend from the downstream wall 45 of the annular tubular member 43 to the downstream periphery of the annular tubular member 43. While helical grooves may be utilized (correlative to the arrangement illustrated in FIGURES 1–3), in the depicted structure the curved grooves 46 turn from a direction parallel to the longitudinal axis of the flowmeter to a direction approximately sixty degrees to the longitudinal axis of the flowmeter at the downstream end of the curved grooves 46. A sufficient flow area to prevent excessive pressure drop exists throughout the length of the curved grooves 46. Since the fluid flows from curved grooves 46 at an angle approximately sixty degrees to the longitudinal axis, rotor blades 47 are at a slight angle to the longitudinal axis of the flowmeter so that the flow relative to said rotor blades 47 approaches ninety degrees in order to maximize the momentum generated by the flowing fluid so as to maintain accurate rotation at low-flow rates. As in previous embodiments any reasonable number of grooves can be provided. Six grooves are illustrated in FIGURES 6 and 7, however, this number is merely a representative showing, the maximum number of blades being limited by pressure drop considerations. The length of the grooves is not critical, although it has been found satisfactory to use one-fourth to one-half turns throughout their length.

A fourth embodiment of the invention is illustrated in FIGURES 8 and 9. While exponentially curved vanes may be utilized (correlative to the arrangement illustrated in FIGURES 4 and 5), in the depicted structure the guide vanes are curved as a helix. A star-shaped support member 48 is mounted on a streamlined hub 49 within a passageway 51 in a housing 52. The hub 49 is locked into the passageway 51 by the support member 48 which is biased in a groove 50 in the wall of passageway 51. Hub 49 has a hole 53 and a threaded bore 54 along its longitudinal axis which receives a shaft 56. Ball bearing 57, supported on shaft 56, rotatably supports a rotor 58. A spacer 59 (which could be a spring if desired) locates bearing 57 away from hub 49 so that the rotor 58 will be free to run on the outer race of bearing 57 without striking hub 49. A hub 61 of generally conoidal shape having a shoulder 62 thereon is secured to the end of shaft 54 with shoulder 62 abutting against the inner race of bearing 56 to prevent hub 61 from contacting the outer race of bearing 57. Blades 63 are mounted on the outer periphery of the rotor 58. These blades are actuated by fluid flow which has a rotational component of velocity due to helical guide vanes 64 formed on the outer periphery of hub 49. The working concept present in this modification is the same as that described in the form shown in FIGURES 1–3.

In the operation of the various embodiments of the concept disclosed, the guide vane or director sections serve to eliminate the effects of upstream variations in the direction of flow and in accordance with the provisions of the present invention they further serve as an important element of the means for increasing the effective fluid force on the rotor blade so that the rotor in each of the embodiments disclosed above will operate at a high frequency at low rates of flow.

By way of summary, in both the helical embodiments and the exponential embodiments, the following characteristics are present. The angle of pitch at the downstream ends of the guide vanes or grooves is not critical but usually will approach more than sixty degrees in order to maximize the momentum of the flowing fluid. Furthermore, in order to achieve the most effective action in the director section, whether of the helical or exponential form, the vanes or grooves should be turned through the longitudinal length of the director section to a degree which will prevent any linear stream of fluid from passing through the director section without being acted upon by a portion of the vanes or grooves so as to turn the linear stream of fluid to increase its effective velocity adjacent a turbine rotor section.

It will be understood that the specific embodiments of the improved flowmeter which are herein disclosed and described are presented for purposes of explanation and illustration and are not intended to indicate limits of the invention, the scope of which is defined by the following claim.

What is claimed is:

A flowmeter for measuring the flow of low velocity fluids in the order of approximately one-half of a gallon per hour comprising; a housing having an inlet chamber and an outlet chamber in axial alignment with said inlet chamber, a passageway interconnecting said inlet chamber and said outlet chamber for conducting fluid therebetween having an inner surface of a first diameter, a rotor rotatively mounted in said passageway having blades rotationally responsive to the impingement of fluid thereon, a magnetic pickup unit in proximity to said rotor and disposed in magnetic circuit with said blades of said rotor, said unit producing an output signal each time one of said blades passes in proximity thereto, said signal having a characteristic corresponding to the speed of rotation of said rotor, and means for increasing the rate of flow and the impact momentum of the fluid at the rotor for increasing the velocity of rotation of said blades at said low flow velocity thereby increasing the characteristic of said output signal comprising; a hub supported in said passageway immediately upstream of said rotor having a peripheral surface of a second diameter, said second diameter being greater than two-thirds of said first diameter and defining a constricted annular space between said inner surface and said peripheral surface as compared to said passageway, and director vanes mounted on said hub extending radially outwardly therefrom into engagement with said inner surface and forming spiral director passages in said annular space for directing the fluid through the constricted annular space at an angle relative to the axial direction, the constricted cross-sectional area of said spiral passages and the impartation of a rotational velocity to the fluid flowing therethrough coacting to increase the velocity and impact momentum of the fluid in the direction of the flow through said passages.

References Cited by the Examiner

UNITED STATES PATENTS

| | | | |
|---|---|---|---|
| 111,040 | 1/1871 | Buschman | 73—231 |
| 1,152,952 | 9/1915 | Kepka | 73—231 X |
| 1,795,340 | 3/1931 | Larson | 73—231 |
| 2,146,827 | 2/1939 | Kruspi | 73—198 |
| 2,709,366 | 5/1955 | Potter | 73—231 X |
| 2,713,261 | 7/1955 | Butterworth et al. | 73—231 X |
| 2,812,661 | 11/1957 | Cox | 73—231 |
| 2,934,947 | 5/1960 | Buck | 73—231 X |

FOREIGN PATENTS

| | | |
|---|---|---|
| 16,557 | 10/1903 | Sweden. |

OTHER REFERENCES

Publication: "Mass Flow Measurement," by Robert Siev, published in Instruments and Control Systems, vol. 33, June 1960, (page 968 relied on).

RICHARD C. QUEISSER, *Primary Examiner.*

ROBERT L. EVANS, JOSEPH P. STRIZAK, *Examiners.*